May 29, 1934.   J. L. MAULL   1,960,501
FRUIT JUICE EXTRACTOR
Filed Oct. 9, 1933   2 Sheets-Sheet 1

Inventor
JAMES L. MAULL
By Mason Fenwick Lawrence
Attorneys

May 29, 1934.    J. L. MAULL    1,960,501
FRUIT JUICE EXTRACTOR
Filed Oct. 9, 1933    2 Sheets-Sheet 2

Inventor
JAMES L. MAULL
By Mason Fenwick & Lawrence
Attorneys

Patented May 29, 1934

1,960,501

UNITED STATES PATENT OFFICE 1,960,501

FRUIT JUICE EXTRACTOR

James L. Maull, Orlando, Fla., assignor to J. L. Maull, Inc., Orlando, Fla., a corporation of Florida Application October 9, 1933, Serial No. 692,887

8 Claims. (Cl. 100—41)

The invention forming the subject matter of this application is an improvement on the fruit juice extracting apparatus disclosed in my United States Patents No. 1,922,773, September 15, 1933; and No. 1,925,196, October 5, 1933.

As in my aforesaid patents, the present invention includes a cylindrical tube having a stop between its ends and having its periphery provided with apertures, and adapted to have one end thereof secured in a cup designed to form a seat for an orange or similar fruit.

The main object of the invention is to provide devices of this character which can be cheaply manufactured and which can be very readily operated, without the necessity of the operator applying his hand to the fruit, to extract juice free of pulp and seeds from an orange or similar fruit.

Other objects of the invention will become apparent as the detailed description thereof proceeds.

Figure 1:
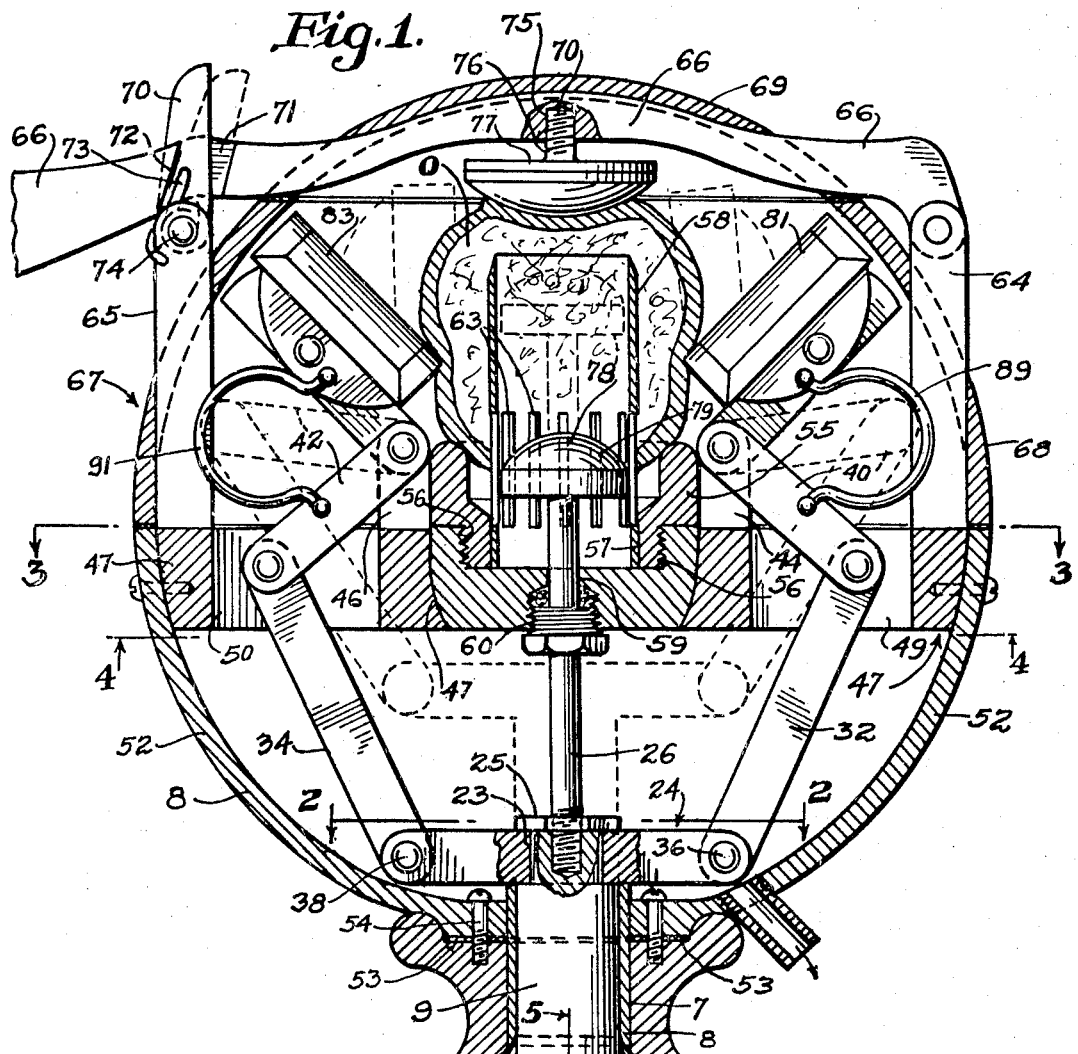
Figure 1 is a central vertical section through a physical embodiment of the invention.

As shown in the drawings, the invention comprises a hollow standard 1 having its lower end spread outwardly to form a base 2. The standard 1 is cast or bored to form a chamber 3 which is closed at the lower end by a plate 4 seated in a recess 5 formed in the base 2. The plate 4 is detachably secured in said recess by means of screws 6.

The upper end of the chamber 3 is turned inwardly to form a cylindrical aperture 7 provided with a bushing 8 in which a cylindrical rod 9 is mounted to reciprocate. The lower end of the rod 9 is slotted axially to receive the upper end of a plate 10, which, when seated in the slot 11, is suitably secured therein by the pins 12 and 13. The plate 10 is spread in opposite directions at its lower end to contact lightly with opposite sides of the chamber 3, and is provided with a slot 14 extending at right angles to the axis of the rod 9.

Figure 5:
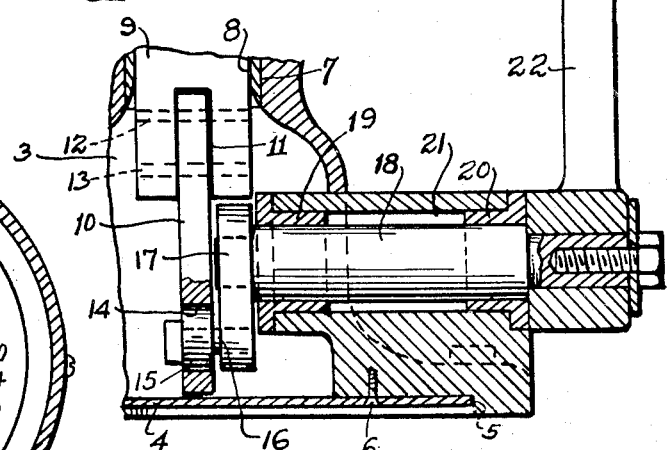
Figure 5 is a vertical transverse section taken on the line 5—5 of Figure 1.

The slot 14 has a roller 15 mounted to slide from one end to the other thereof. The roller 15 is mounted on a pin 16 extending horizontally from a crank 17 (see Figure 5). The crank 17 is fixedly secured to a crank shaft 18 having its opposite ends rotatably mounted in flanged bushings 19 and 20 which are mounted in opposite ends of a tubular bore 21 cast partly in the base 2 and in the standard 1 extending therefrom. The shaft 18 has a handle 22 fixed rigidly to its outer end by any suitable means.

It will be obvious that the construction just described forms a Scotch yoke for converting the rotary movement of the handle 2 into a rectilinearly reciprocating movement of rod 9 in the cylindrical bushing 8. The upper end of the rod 9 is shouldered to form a seat 23 for a spider, designated generally by the reference numeral 24 and shown somewhat in detail in Figure 2 of the drawings. The spider 24 is fixedly secured in this seat by means of a lock nut 25 which is screwthreaded on to the lower end of a plunger operating rod 26 which, in turn, is screwthreaded axially into the upper end of the rod 9.

Figure 2:
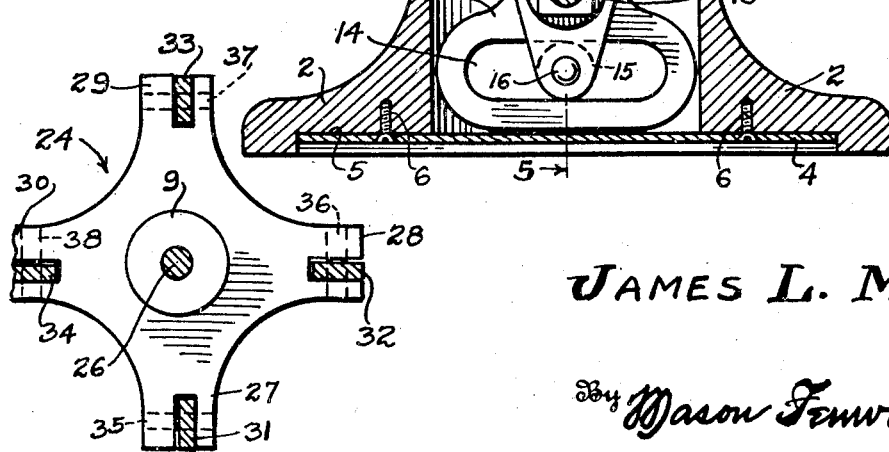
Figure 2 is a horizontal section taken on the line 2—2 of Figure 1.
Figure 3:
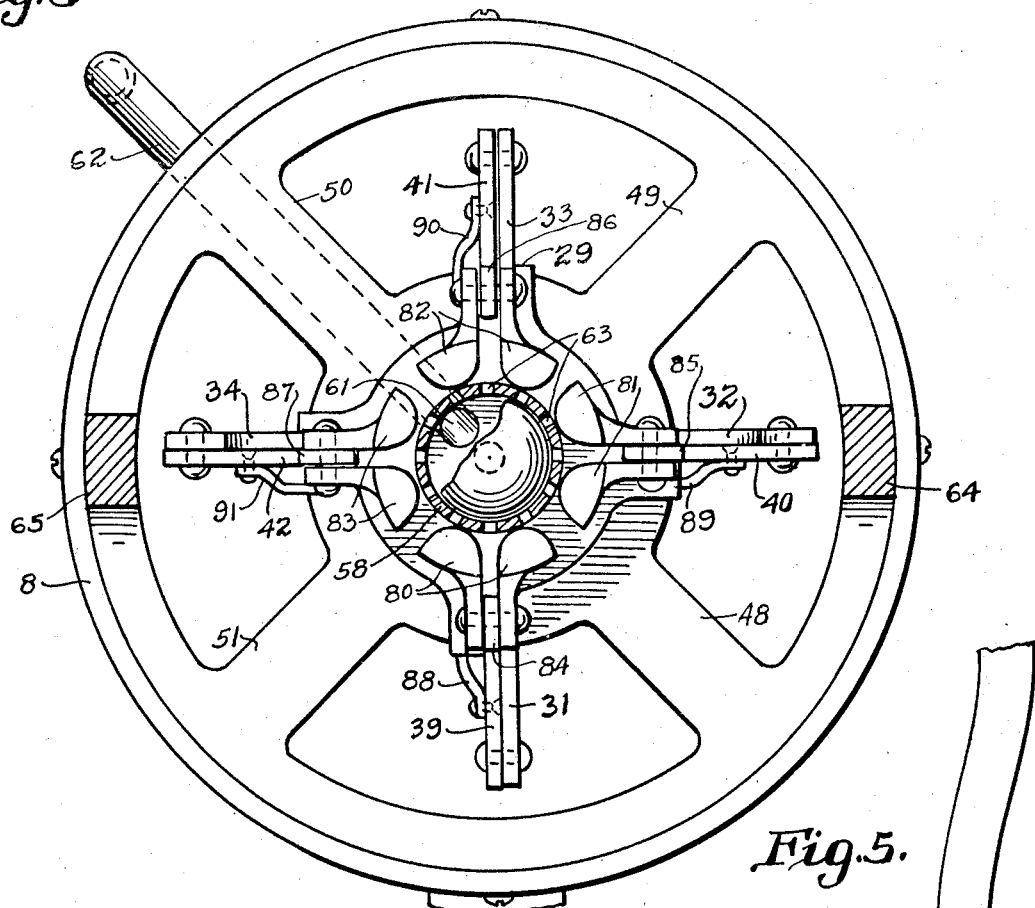
Figure 3 is a horizontal section taken on the line 3—3 of Figure 1.
Figure 4:
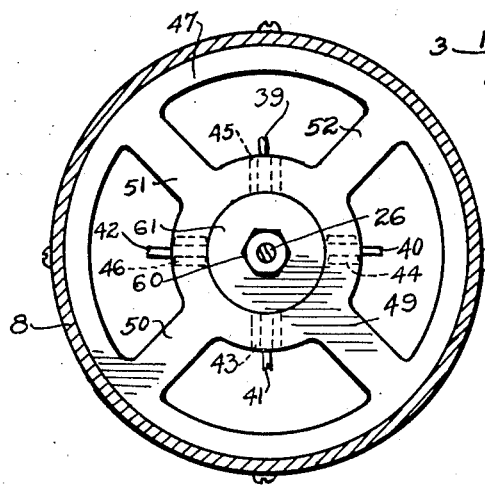
Figure 4 is a fragmentary horizontal section taken on the line 4—4 of Figure 1.

As will be apparent from Figure 2 of the drawings, the spider 24 comprises four arms 27, 28, 29 and 30, slotted at their outer ends to receive the lower ends of links 31, 32, 33 and 34, respectively, which are pivotally secured in the slotted ends of the said spider by means of the pivot pins 35, 36, 37 and 38, respectively. The upper ends of the links 31, 32, 33 and 34 are pivotally connected to the lower ends of links 39, 40, 41 and 42, respectively; and the other ends of the links 39, 40, 41 and 42 are pivotally connected to standards 43, 44, 45 and 46 extending vertically upward from the base of a spider 47 which is suitably secured to a rim connecting the ends of its arms 48, 49, 50 and 51 to the upper end of a hemispherical casing 52.

The upper end of the standard 1 is spread outwardly to form an annular dished out seat 53 extending around the upper part of the bushing 8. The lower part of the hemispherical casing 52 is centrally apertured to fit closely around the bushing 8; and this apertured part of the casing 52 is shaped so as to fit the seat 53. Any suitable number of machine screws 54 may be used to secure the casing 52 securely in said seat.

The standards 43, 44, 45 and 46 are arranged on their respective spider arms concentrically around the axis of the operating rod 26 and form reinforcing members for a cup-shaped member 55 which is screwthreaded at its lower end to be detachably secured in a cylindrical recess 56 formed centrally of the spider 47. The cup member 55 is formed to receive frictionally the lower end 57 of a fruit cutting cylinder 58; and the spider 47 is provided with a central aperture 59 in which the rod 26 reciprocates. A packing gland 60 is suitably secured around the rod 26 to the bottom of the spider 47 to prevent passage of liquid along the rod 26 into the operating parts of the apparatus. The bottom of the cup member 55 is provided with a passageway 61 connected to a discharge pipe 62 extending through an aperture suitably formed in the hemispherical casing 52 and is supported thereby.

As in my prior patents, the upper end of the cup member 55 forms a seat for an orange O or similar fruit, and the cutting cylinder 58 is provided in the periphery of the lower part thereof with a series of slots 63 to permit the juice to flow from a squeezed orange into the passageway 61 and thence through the discharge pipe 62.

The outer rim of the spider 47 has standards 64 and 65 extending upwardly therefrom. The upper end of the standard 64 has pivotally connected thereto one end of a handle 66 which extends clear across the upper end of the other standard 65. The handle 66 is shaped at its central part to correspond with the shape of the inner periphery of an upper heimspherical casing 67 having the same diameter as the lower casing 52. The casing 67 is slotted to receive snugly the standards 64 and 65 so that it may be removed bodily along the standards 64 and 65 when the obstructing pivot pins at the upper end thereof are removed. The hemispherical casing 67 is made in two parts 68 and 69, the part 68 being intended to be fixedly secured to the lower casing 52 when the apparatus is assembled for operation. The upper part 69 is suitably fixed to the handle 66 to be swung therewith toward and from the lower part 68.

The upper part 69 serves not only to complete the casing, but also to serve as a reinforcement for the handle 66. Furthermore, it is obvious that the securing of the part 69 to the handle 66 obviates the necessity of the operator performing a separate operation of opening the casing to give access to the fruit cutting cylinder or the fruit thereon within the casing. All the operator has to do to open the apparatus is to swing the handle 66 about its pivot connection to the standard 64. This operation gives access to the inner cutting mechanism of the apparatus for the purpose of removing or positioning fruit to be squeezed.

The upper end of the standard 65 has pivotally secured thereto a latch 70 adapted to swing to and fro in a slot 71 formed in the handle 66 directly over the standard 65. The latch 70 is provided with a notch 72; and the outer end wall of the slot 71 is shaped to correspond to the shape of this notch. A spring 73 is secured at one end to the latch 70 and at its other end to the pivot 74, or other fixed part at the upper end of the standard 65, so as normally to force the latch 70 into locking position as soon as the handle 66 is moved downwardly to bring the part 69 of the casing into closing position.

The central part of the handle 66 is provided with an internally screwthreaded bore 75 to receive an externally screwthreaded pin 76 projecting centrally from the upper end of a presser member 77 adapted to contact with the upper end of an orange O positioned on the cutting cylinder 58. The axis of the presser member is concentric with the axis of said cutting cylinder and of the operating rod 26.

The upper end of the rod 26 is provided with a piston 78 reciprocating freely in the cutting cylinder 58, and adapted to be reciprocated in its cutting cylinder by the rotation of the handle 22. As in my prior patents, it is intended that the orange O will be positioned on the cutting cylinder 58 with its stem or blossom end substantially centered in the cutting cylinder. In this position the handle 66 may be used to force the orange downward to its seat on the upper end of the cup-shaped member 55. When thus secured, the plunger 78 may be forced up into the orange so as to force the disk cut at the end of the fruit in the direction of the axis of the orange to compress the core and seed surrounding the same in a column within the fruit. This compression of the fruit by the plunger 78 will obviously cause the juice to flow through the apertures 63 into the discharge passageway 61, and thence through the spout 62. This would form a complete operation so far as juice extracting is concerned. However, to enhance this juice extracting operation the apparatus is provided with pairs of fingers 80, 81, 82 and 83 adapted to contact with the orange around the periphery thereof and to add their squeezing effect to that of the plunger 79.

The contact fingers at their outer ends are suitably curved to avoid fracturing the skin of the orange during their movements into and out of pressing operation. These pairs of fingers 80, 81, 82 and 83 are suitably fixed at their rear ends to the links 84, 85, 86 and 87, and these links in turn are pivotally connected at their lower ends to the ends of the links 39, 40, 41 and 42, respectively. The links 84, 85, 86 and 87 are caused to move in accordance with the movements of the links 39, 40, 41 and 42 by means of arcuate springs 88, 89, 90 and 91. This yielding connection between the orange pressing fingers and the operating linkage is a very important feature of the invention since it provides for a yielding squeezing action on the orange to eliminate fracture of the skin as much as possible.

It is thought that the invention and numerous of its attendant advantages will be understood from the foregoing description, and it is obvious that numerous changes may be made in the form, construction and arrangement of the several parts without departing from the spirit or scope of my invention, or sacrificing any of its attendant advantages; the form herein described being a preferred embodiment for the purpose of illustrating my invention.

What I claim is:

1. A fruit juice extractor comprising a support, a cup on said support and having its edge adapted to form a seat for an orange or similar fruit, a cylinder fixed in said cup and having a series of apertures spaced apart around its periphery, a plunger reciprocable in said cylinder, means for reciprocating said plunger, means connected to said support for forcing an orange or similar fruit along said cylinder and into contact with said seat, fruit squeezing fingers movably mounted on said support on opposite sides of said cylinder, and means connected to the plunger reciprocating means for moving said fingers toward and from said cylinder.

2. A fruit juice extractor comprising a support, a cup on said support and having its edge adapted to form a seat for an orange or similar fruit, a cylinder fixed in said cup and having a series of apertures spaced apart around its periphery, a plunger reciprocable in said cylinder, means for reciprocating said plunger, means connected to said support for forcing an orange or similar fruit along said cylinder and into contact with said seat, fruit squeezing fingers pivoted to said support on opposite sides of said cylinder connected to the plunger reciprocating means, and means for swinging said fingers about their pivot axes toward and from said cylinder.

3. A fruit juice extractor comprising a support, a cup on said support and having its edge adapted to form a seat for an orange or similar fruit, a cylinder fixed in said cup and having a series of apertures spaced apart around its periphery, means for holding an orange or similar fruit on said seat, a plunger movable axially in said cylinder in fruit held on said seat, and fruit squeezing fingers spaced apart angularly around said cylinder and movable on said support in planes radiating from said cylinder, and means for moving said fingers toward and from said cylinder.

4. A fruit juice extractor comprising a support, a cup on said support and having its edge adapted to form a seat for an orange or similar fruit, a cylinder fixed in said cup and having a series of apertures spaced apart around its periphery, means for holding an orange or similar fruit on said seat, a plunger movable axially in said cylinder in fruit held on said seat and fruit squeezing fingers spaced apart and pivoted to said support angularly around said cylinder, and means for swinging said fingers about their pivot axes toward and from said cylinder.

5. A fruit juice extractor comprising a support, a cup on said support and having its edge adapted to form a seat for an orange or similar fruit, a cylinder fixed in said cup and having a series of apertures spaced apart around its periphery, means for holding an orange or similar fruit on said seat, a plunger movable axially in said cylinder in fruit held on said seat, means for moving said plunger in said cylinder, fruit squeezing fingers spaced apart around said cylinder and mounted on said support to move toward and from said cylinder, and means for moving said plunger and fingers.

6. A fruit juice extractor comprising a support, a cup on said support and having its edge adapted to form a seat for an orange or similar fruit, a cylinder mounted on said cup and extending therefrom beyond said edge, means for holding fruit against said seat with the cylinder projecting into said fruit, a plunger reciprocable in said cylinder to squeeze the interior of the fruit in the direction of said holding means, fruit squeezing means spaced angularly apart around said cylinder and mounted on said support for movement toward and from said cylinder, and means for simultaneously reciprocating said plunger and moving said fruit squeezing means.

7. A fruit juice extractor comprising a support, means for holding an orange or similar fruit in fixed position on said support and including an apertured cylinder projecting into the fruit when held in said position, means reciprocable in said cylinder for squeezing the fruit toward said holding means, means mounted to move on said support to squeeze the fruit in a direction across the axis of said cylinder, and means for simultaneously operating said fruit squeezing means.

8. A fruit juice extractor comprising a support, means for holding an orange or similar fruit in fixed position on said support and including an apertured cylinder projecting into the fruit when held in said position, means reciprocable in said cylinder for squeezing the fruit toward said holding means, means mounted to move on said support to squeeze the fruit in a direction across the axis of said cylinder, and means for operating said fruit squeezing means.

JAMES L. MAULL.